United States Patent [19]

Tunoda

[11] Patent Number: 4,884,762
[45] Date of Patent: Dec. 5, 1989

[54] BAIL ARM TURNING MECHANISM FOR SPINNING REEL

[75] Inventor: Kikuo Tunoda, Fuchu, Japan

[73] Assignee: Ryobi Ltd., Hiroshima, Japan

[21] Appl. No.: 271,783

[22] Filed: Nov. 16, 1988

[30] Foreign Application Priority Data

Nov. 30, 1987 [JP] Japan .............................. 62-183101[U]

[51] Int. Cl.[4] .............................................. A01K 89/00
[52] U.S. Cl. .................................................... 242/236
[58] Field of Search .................. 242/84.2 G, 84.2 R, 242/84.2 A, 84.2 F, 84.21 A

[56] References Cited

U.S. PATENT DOCUMENTS 4,350,312  9/1982  Masclet .......................... 242/84.2 G
4,705,228  11/1987  Maruyama et al. ...... 242/84.21 A X Primary Examiner—Stuart S. Levy
Assistant Examiner—L. Schleider
Attorney, Agent, or Firm—Sughrue, Mion, Zinn, Macpeak and Seas

[57] ABSTRACT

A bail arm turning mechanism in a spinning reel is disclosed. The spinning reel has first and second ears for pivotally supporting a bail arm lever and bail arm cam, respectively, to which each end of the bail arm is connected. A manual operation lever is pivotally supported to the first ear, and a rotational lever is provided in the first ear. The rotational lever has front, intermediate and rear portion. The front portion is engageable with the bail arm lever, and the rear portion is abuttable to the manual operation lever. Upon manipulation of the manual operation lever, the rear portion of the rotational lever is pivotally moved about an axis of the intermediate portion, so that the front portion pivots, to thereby rotate the bail arm lever, to thus provide bail arm turning.

8 Claims, 4 Drawing Sheets

BAIL ARM TURNING MECHANISM FOR SPINNING REEL

BACKGROUND OF THE INVENTION

The present invention relates to a bail arm turning mechanism for a spinning reel.

One conventional bail arm turning mechanism is disclosed in U.S. Pat. No. 4,427,161 in which a bail arm is turned by pulling a manupulation lever by a finger. According to the conventional mechanism as shown in FIGS. 1 and 2, a pivot shaft 113 extends through a bail attaching member 102 which is secured to a rotor 101, and the manupulation lever 115 is pivotally secured to the attaching member 102 through the shaft 113. The lever 115 has one end provided with a manipulation portion 114 adapated to be lifted by the forefinger of the hand holding the rod 118. Another end of the lever 115 is provided with an actuation tab 116 engageable with a projection 109 provided at one end of a crank 110. The crank 110 is rotatably supported on the bail attaching member 102, and has another end formed with a slot 108. One end of the bail arm 104 is connected to an arm lever 105 rotatably supported on the bail attaching member 102 by a pin 106. The arm lever 105 has an upper surface from which a pin 112 extends upwardly to engage the slot 108.

By manually pulling the manupulation portion 114, the actuation tab 116 urges the projection 109, so that the arm lever 105 is rotated about the pin 106 because of the engagement between the slot 108 and the projection 112. As a result, the bail arm 104 is turned from its fishing line winding position (FIG. 1) to the releasing position.

However, with this structure, since the crank 110 is rotatably moved on the upper surface of the arm lever 105, these mechanical components are protruded in assembly radially outwardly of the rotor 101. As a result, rotational imbalance may occur. Further, since these components are exposed to the atmosphere, seawater or dust may enter these components, smooth bail turning action may become degraded due to generation of rust, and fishing line may be entangled with the crank to cause line cutting.

Another conventional bail arm turning mechanism is disclosed in U.S. Pat. No. 4,676,450 assigned to Brunswick Corp. and entitled "Quick Bail Opening System for Fishing Reel".

SUMMARY OF THE INVENTION

It is therefore, an object of this invention to overcome the above described drawbacks, and to provide an improved bail arm turning mechanism in a spinning reel.

Another object of this invention is to provide such mechanism capable of providing smooth and accurate bail arm turning action with minimized numbers of mechanical components;

Still another object of this invention is to provide such mechanism in which a bail arm is smoothly and stabilizingly turned from its fishing line rewinding position to releasing position without any discontinuity in time from fishing line rewinding operation to casting operation.

Still another object of this invention is to provide such mechanism which is protectable against seawater and dust, to thereby enhance service life of the mechanism.

To attain these objects, according to the present invention there is provided a bail arm turning mechanism in a spinning reel which includes a rotor: spool; first and second ears carried by the rotor and positioned at diametrically opposite side of the rotor and extending toward the spool, the first ear having an upper side portion; a bail arm lever rotatably supported to the first ear; a bail arm cam rotatably supported to the second ear; a bail arm having one end pivotally supported to the bail arm lever and another end pivotally supported to the bail arm cam; and a dead point spring disposed to selectively bias said bail arm cam toward a fishing line rewinding position and a releasing position to thus provide these two positions of the bail arm; the improvement comprising; a manual operation lever pivotally supported to the upper side portion of the first ear, the manual operation lever having a front manupulation portion, a pivot portion and a rear portion, and the manupulation portion being pivotable between its upper and lower positions; a restoration means connected to the manual operation lever to bias the same toward the lower position; said first ear being formed with a recessed portion which has an upper open end; and a rotational lever disposed in the recessed portion. The rotational lever has a main elongated portion having front and rear ends and a central axis, a front boss portion extending from the front end of the main elongated portion, and a rear boss portion extending from the rear end of the main elongated portion. The front boss portion is engageable with the bail arm lever, and the rear boss portion is in abutment with the rear portion of the manual operation lever. The rotational lever is rotatable about the central axis upon the rear portion urging the rear boss portion in response to the lower position of the manual operation lever.

When the rear portion of the rotational lever pivots about the central axis, the front portion thereof is also pivots about the central axis, so that the bail arm lever is rotated. This rotation of the bail arm lever is further assured by the biasing force of the dead point spring. As a result, the bail arm is automatically moved from its fishing line rewinding position to releasing position.

DETAILED DESCRIPTION OF THE PREFERRED EMBODIMENTS

Figure 2:
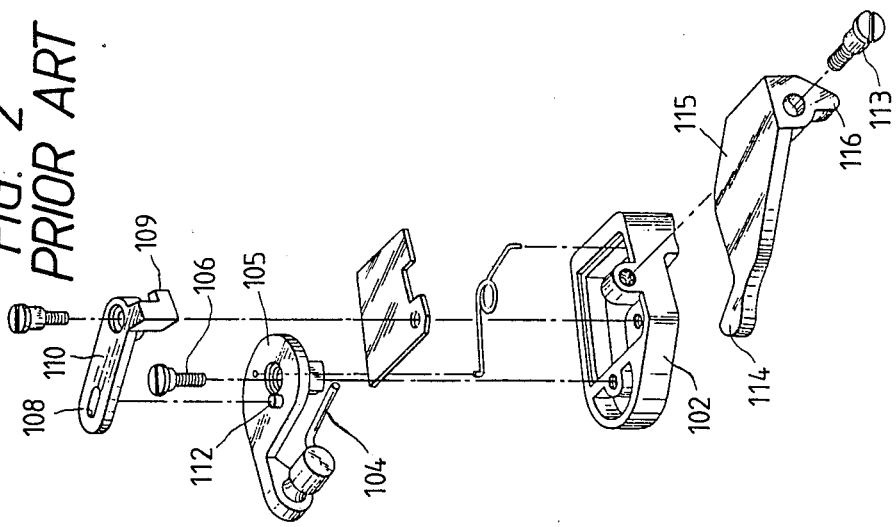
FIG. 2 is a fragmantary perspective view showing major components in the conventional bail turning mechanism.
Figure 1:
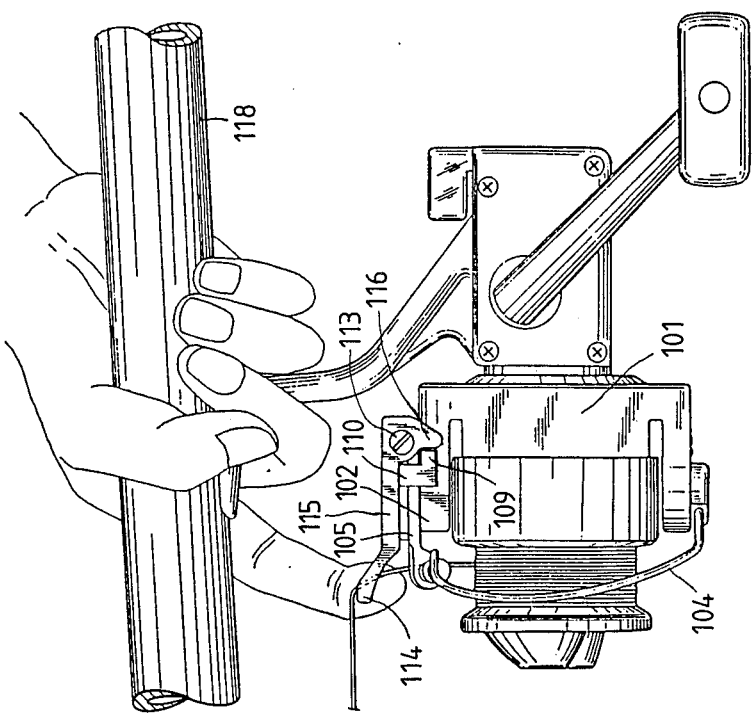
FIG. 1 is a side elevational view showing a spinning reel incorporating a conventional bail turning mechanism.
Figure 3:
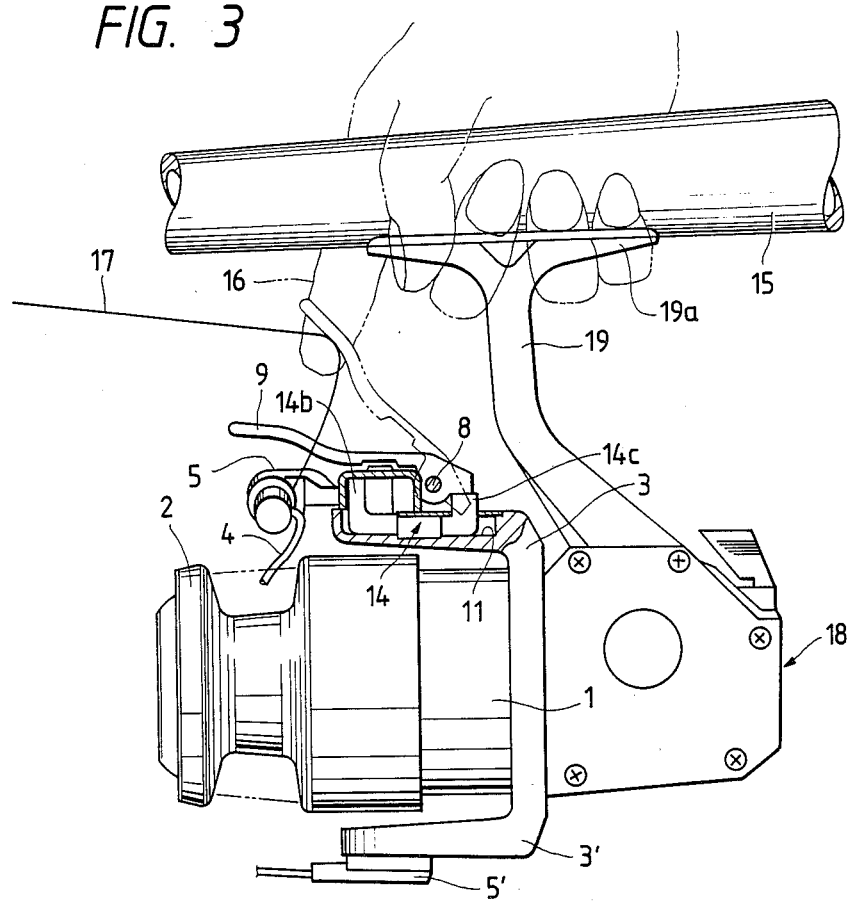
FIG. 3 is a side elevational view showing a spinning reel incorporating a bail turning mechanism according to the present invention.

A first embodiment according to this invention is shown in FIGS. 3 thru 9. As best shown in FIG. 3, a spinning reel generally includes a reel body 18 from which a stem 19 extends. The stem 19 has a shoe 19a at its free end to attach the reel body 18 to a fishing rod 15. A rotor 1 is rotatably supported to the reel body 18 and is rotated about an axis of a spool 2. The bail ears 3 and 3' are integral with the rotor 1 at diametrically opposite sides thereof and rotate with the rotor 1. A bail arm 4 has one end connected to a bail arm lever 5 pivotally supported to the ear 3, and the bail arm 4 has another end connected to a bail arm cam 5' pivotally supported to the ear 3'. For the fishing line retrieval, a fishing line 17 is captured by the bail arm 4 and is wound on the spool 2 when the rotor 1 is rotated. Such structure is well known in the art, and therefore, further description may be eliminatable.

Figure 9:
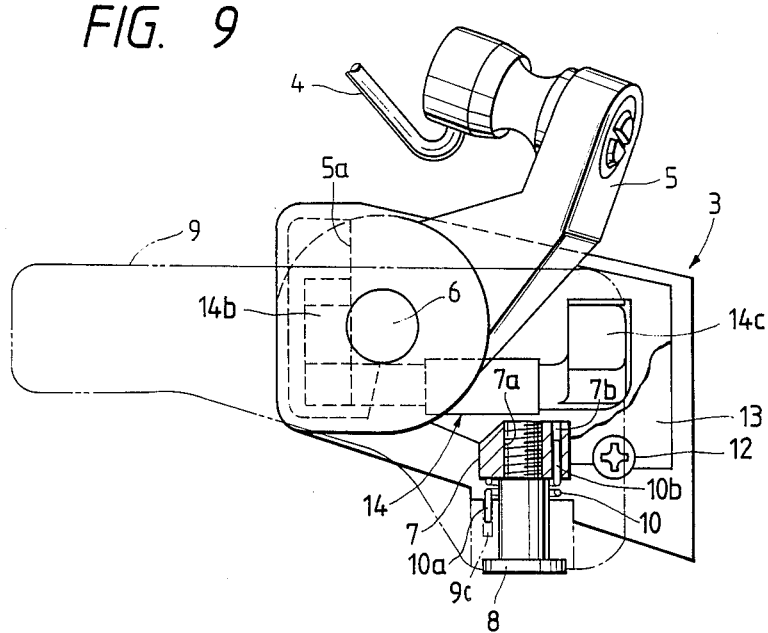
FIG. 9 is a plan view partially cross-sectioned showing a bail turning mechanism in its filing line releasing position according to the first embodiment of this invention; and, FIG. 10 is a vertical cross-sectional elevation showing a bail turning mechanism according to a second embodiment of this invention.

These ears 3 and 3' extend frontwardly toward the spool 2 in an axial direction of the rotor 1. The bail arm lever 5 is rotatably supported to a front end portion of the ear 3 by a pin 6, and the bail arm cam is rotatably supported to a front end portion of the ear 3'. The bail arm lever 5 has an inner portion confronting the ear 3, which inner portion is formed with a groove 5a (see FIGS. 4 and 7). Within the ear 3', a dead point spring (not shown) is accommodated which provides two fixed positions by a biasing force thereof, so that the bail arm 4, the bail arm lever 5 and the bail arm cam 5' can provide fishing line rewinding position (FIG. 4) and fishing line releasing position (FIG. 9). The employment of the dead point spring is also well known in the art.

Figure 4:
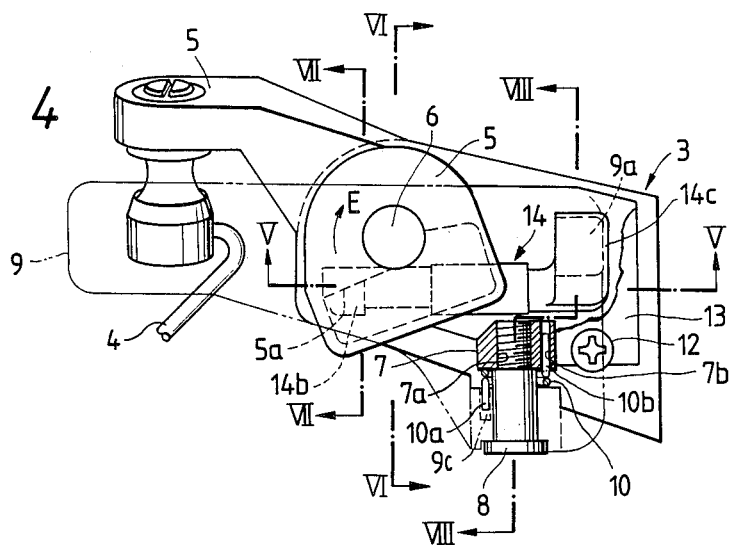
FIG. 4 is a plan view partially cross-sectioned showing a bail turning mechanism in its fishing line rewinding state according to a first embodiment of this invention.
Figure 5:
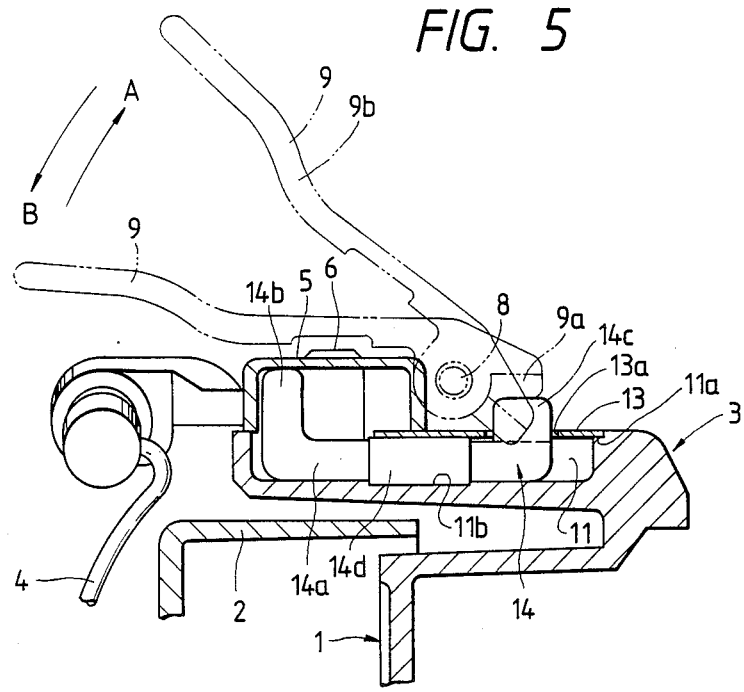
FIG. 5 is a cross-sectional view taken along the line V—V of FIG. 4.
Figure 6:
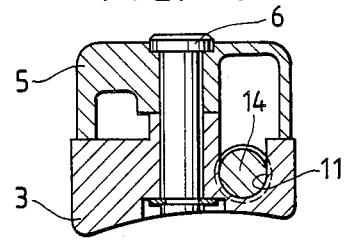
FIG. 6 is a cross-sectional view taken along the line VI—VI of FIG. 4.

As shown in FIGS. 4 and 5, a boss 7 is integrally provided to the ear 3' at a position rearwardly with respect to the bail arm lever pivotting position (pin 6). The boss 7 extends in a direction perpendicular to the axial direction of the rotor 1. The boss 7 is formed with a female screw 7a with which a screw 8 is threadingly engaged. Further, a manual operation lever 9 is pivotally provided about the screw 8. The manual operation lever 9 has a major manupulation portion 9b at its front portion with respect to the screw 8, and an operational projection 9a at its rear portion.

A restoration spring 10 is interposed between the manual operation lever 9 and the ear 3 so as to normally urge the major manupulation portion 9b toward its horizontal orientation. Thus, the manual operation lever 9 is pivotally movable in a vertical direction as indicated by arrows A and B in FIG. 5. The restoration spring 10 may be a torsion spring. The torsion spring is disposed over the screw 8, and has one end engaged with a spring latch hole 9c formed in the manual operation lever 9 and another end engaged with a spring latch hole 7b formed in the boss 7.

A recessed portion 11 is formed at an upper surface of the ear 3. The recessed portion 11 extends in axial direction of the rotor 1. At an open marginal portion of the recessed portion 11, a seat 11a is formed, and a cover 13 is seated over the seat 11a and is fixed thereto by a screw 12 (FIG. 4) so as to close the open end of the recessed portion 11. The cover 13 is formed with a hole 13a. Further, at an intermediate portion of the recess 11, an additional recess 11b is formed.

A rotational lever 14 is rotatably provided within the recess 11. The rotational lever 14 has a main portion 14a having circular cross-section and extending in the axial direction of the rotor 1, a first or front boss portion 14b extending from a front end of the main elongated portion 14a in a direction perpendicular thereto, and a second or rear boss portion 14c extending from a rear end of the main portion 14a in a direction perpendicular thereto. These portions 14a, 14b and 14c are integrally provided with each other. Further, an enlarged shaft portion 14d is provided at the main elongated portion 14a. The enlarged portion 14d is engageable with the additional recess 11b so as to eliminate displacement of the lever 14 in axial direction of the rotor 1.

Figure 7:
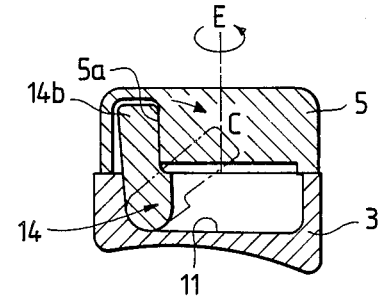
FIG. 7 is a cross-sectional view taken along the line VII—VII of FIG. 4.
Figure 8:
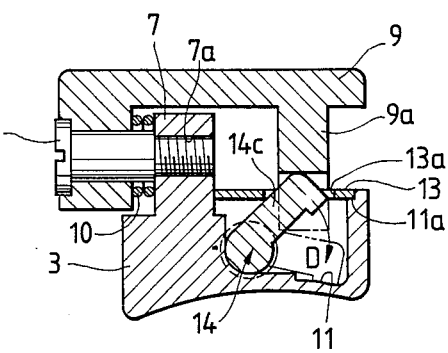
FIG. 8 is a cross-sectional view taken along the line VIII—VIII of FIG. 4.

The front boss portion 14b is engageable with the groove 5a of the bail arm lever 5 as shown in FIG. 7. Therefore, if the main elongated portion 14a of the lever 14 is rotated about its axis, the front boss portion 14b urges the bail arm lever 5 to rotate about the pin 6. Further, the rear boss portion 14c is positioned to pass through the hole 13a of the cover 13, and is in abutment with the projection 9a of the manual operation lever 9. The rear boss portion 14c obliquely extends through the hole 13a in fishing line rewinding position. When the manual operation lever 9 is pulled upwardly in the direction A in FIG. 5, the projection 9a downwardly passes through the hole 13a and urges the rear boss portion 14c downwardly in a direction D in FIG. 5.

As shown in FIG. 3, the manual operation lever 9 is pulled by a finger of a rod holding hand. Therefore, fishing line guiding operation can be concurrently performed by the identical finger as shown.

Figure 10:
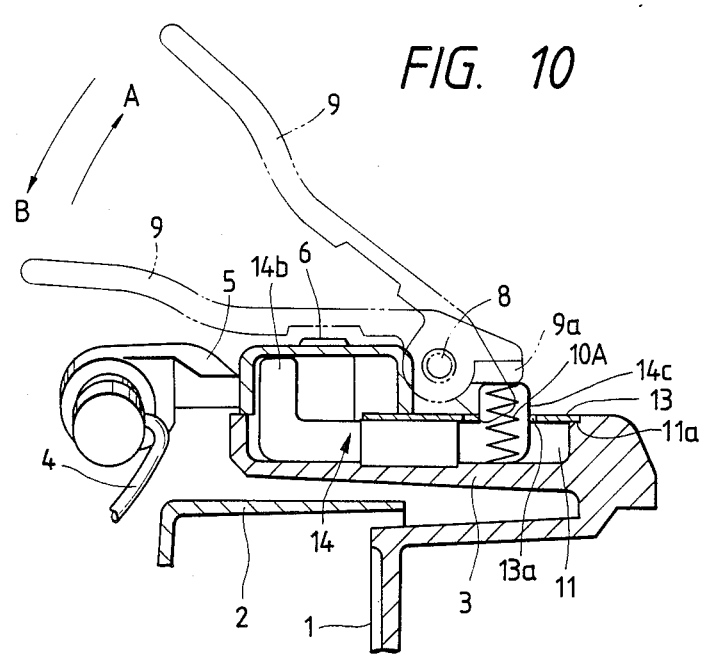

According to a second embodiment of this invention, almost all construction is the same as the first embodiment except the restoration spring 10. In the first embodiment, the torsion spring is used, whereas in the second embodiment, a coil spring 10A is used as shown in FIG. 10. In the latter case, the coil spring 10A has one end in contact with a bottom face of the recessed portion 11 and another end engageable with the rear portion of the manual operation lever 9. As a result, the operation lever 9 can be urged toward its horizontal direction.

In operation, as shown in FIG. 3, when an operator scratches the fishing line 17 by his finger of a rod gripping hand, and simultaneously pulls up the manual operation lever 9 by the identical finger against the biasing force of the restoration spring 10, the lever 9 is pivoted about the pin 8 from a position shown by a solid line to a position shown by a phantom line. By this pivotal movement of the lever 9, the operational projection 9a is moved into the hole 13a of the cover 13 and depresses the obliquely extending rear boss portion 14c, so that the rear boss postion 14c is pivotted about a central axis of the main elongated portion 14a from a position shown by a solid line to a position shown by a phantom line in FIG. 5. That is, the rear boss portion 14c is pivotted in the direction D of FIG. 8. Therefore, the front boss portion 14b is also pivotted about the central axis, since these boss portions are integrally provided, from a position shown by a solid line to a position shown by a phantom line in FIG. 7. That is, the front boss portion 14b is pivotted to a direction shown by an arrow C in FIG. 7. By this pivotal movement of the front boss portion 14b, the bail arm lever 5 is rotated about the shaft 6 in a direction indicated by an arrow E in FIG. 4, since the front boss portion 14b is engaged with the groove 5a of the bail arm lever 5. If the angular rotation of the bail arm lever 5 exceeds a dead point of the dead point spring (not shown) provided in the bail arm cam 5′, the bail arm lever 5 is further rotated in the same direction because of the biasing force of the dead point spring. Accordingly, the bail arm 4 is automatically turned to a fishing line releasing position shown in FIG. 9.

Thereafter, if the manual operation lever 9 is released, the lever 9 is moved to its original position because of the biasing force of the restoration spring 10. However, in this case, the fishing line releasing position is still maintainable because of the biasing force of the dead point spring, and therefore, the bail arm cannot restore its fishing line rewinding position. The bail arm rewinding position can be obtained by manually turning the bail arm after the manual operation lever 9 is released. Alternatively, a conventional bail arm turning mechanism can be incorporated into the recessed portion 11 of the ear 3 for automatically turning the bail arm to its rewinding position.

In view of the foregoing, according to the present invention, the rotational lever 14 is directly operated by the manual operation lever 9 without intervening member, and therefore, no power transmission loss is provided, and the bail arm turning is facilitated with a minimized load. Further, there is no supplmental mechanical components between the bail arm lever 5 and the manual operation lever 9. Therfore, reduced numbers of mechanical components result, and resultant mechamism can be manufactured at low cost with minimized weight. Furthermore, since the bail arm turning mechanism is installed in the ear 3, the mechanism is protected from seawater and dusts, to thus ensure smooth and prolonged operation without any mechanical break-down.

While the invention has been described in detail and with reference to specific embodiments thereof, it would be apparent for those skilled in the art that various changes and modifications can be made therein without departing from the spirit and scope of the invention.

What is claimed is:

1. In a bail arm turning mechanism in a spinning reel which includes a rotor: a spool having a spool axis; first and second ears carried by said rotor and positioned at diametrically opposite side of said rotor and extending toward said spool, said first ear having a radially outward side portion extending radially outwardly with respect to said spool axis; a bail arm lever rotatably supported to said first ear about a first axis; a bail arm cam rotatably supported to said second ear; a bail arm having one end pivotally supported to said bail arm lever and another end pivotally supported to said bail arm cam; and a dead point spring disposed to selectively bias said bail arm cam toward a fishing line rewinding position and a releasing position to thus provide these two positions of said bail arm; the improvement comprising;

a manual operation lever (9) pivotally supported to said radially outward side portion of said first ear (3), said manual operation lever having a front manupulation portion (9b), a pivot portion and a rear portion having a second axis (9a), and said manupulation portion being pivotable between radially outward and radially inward positions;

a restoration means (10) connected to said manual operation lever to bias the same toward said radially inward position;

said first ear (3) being formed with a recessed portion (11) which has a radially outwardly facing open end; and a rotational lever (14) disposed in said recessed portion (11), said rotational lever (14) having a main elongated portion (14a) having front and rear ends and a central axis in parallel with said spool, a front boss portion (14b) extending from said front end of said main elongated portion, and a rear boss portion (14c) extending from said rear end of said main elongated portion, said front boss portion (14b) being engageable with said bail arm lever (5), and said rear boss portion (14c) being in abutment with said rear portion (9a) of said manual operation lever (9), said rotational lever (14) being rotatable about said central axis upon said rear portion (9a) urging said rear boss portion (14c) in response to said lower position of said manual operation lever wherein the first, second, and central axes are mutually orthongonal.

2. The improvement of claim 1, further comprising; a cover member (13) disposed to cover said open end, said cover member (13) being formed with a hole (13a) through which said second boss portion (14c) is pivotally moved, said rear portion (9a) of said manual operation lever (9) passing through said hole (13a) at said lower position of said manual operation lever (9).

3. The improvement of claim 1, wherein said front boss portion (14b) extends in a first direction perpendicular to said main elongated portion (14a), and said rear boss portion (14c) extends in a second direction perpendicular to said main elongated portion (14a), said first direction being different from said second direction.

4. The improvement of claim 1, wherein said bail arm lever 5 has a radially inwardly facing surface confronting said first ear (3), said lower surface being formed with a groove (5a) with which said front boss portion (14b) is engageable.

5. The improvement of claim 1, wherein said restoration means comprises a torsion spring (10) having one end connected to said manual operation lever (9) and another end connected to said first ear (3).

6. The improvement of claim 1, wherein said restoration means comprises a coil spring (10A) having one end in contact with said recessed portion (11) and another end in contact with said rear portion (9a) of said manual operation lever (9).

7. The improvement of claim 1, wherein said first ear (3) is integrally provided with a boss (7) extending from said upper side portion, and further comprising a screw (8) threadingly engaged with said boss (7), said pivot portion of said manual operation lever (9) being disposed over said screw (8).

8. The improvement of claim 7, wherein said restoration means comprises a torsion spring having one end connected to said manual operation lever and another end connected to said boss (7).

* * * * *